United States Patent
Park et al.

(10) Patent No.: US 9,477,499 B2
(45) Date of Patent: *Oct. 25, 2016

(54) MANAGING PROCESS MIGRATION FROM SOURCE VIRTUAL MACHINE TO TARGET VIRTUAL MACHINE WHICH ARE ON THE SAME OPERATING SYSTEM

(71) Applicant: Samsung Electronics Co., Ltd., Suwon-si (KR)

(72) Inventors: Seong-yeol Park, Yongin-si (KR); Sang-bum Suh, Seoul (KR); Kyung-ah Chang, Seoul (KR); Min-kyung Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

This patent is subject to a terminal disclaimer.

(21) Appl. No.: 13/891,423

(22) Filed: May 10, 2013

(65) Prior Publication Data

US 2013/0268932 A1    Oct. 10, 2013

Related U.S. Application Data

(63) Continuation of application No. 12/546,961, filed on Aug. 25, 2009, now Pat. No. 8,458,696.

(30) Foreign Application Priority Data

Dec. 17, 2008 (KR) .................. 10-2008-0128533

(51) Int. Cl.
 *G06F 9/455* (2006.01)
 *G06F 9/46* (2006.01)
 *G06F 12/00* (2006.01)

(52) U.S. Cl.
 CPC .......... *G06F 9/455* (2013.01); *G06F 9/45533* (2013.01)

(58) Field of Classification Search
 None
 See application file for complete search history.

(56) References Cited

U.S. PATENT DOCUMENTS

| | | | |
|---|---|---|---|
| 6,934,755 | B1 | 8/2005 | Saulpaugh et al. |
| 7,178,050 | B2 | 2/2007 | Fung et al. |
| 7,512,769 | B1 | 3/2009 | Lowell et al. |
| 7,962,918 | B2 | 6/2011 | Schaefer et al. |
| 8,245,013 | B2 | 8/2012 | Ganesh et al. |
| 2003/0028868 | A1* | 2/2003 | Kumakura ............... 717/175 |
| 2003/0115434 | A1 | 6/2003 | Mahallingam et al. |
| 2005/0066303 | A1 | 3/2005 | Rochette et al. |

(Continued)

FOREIGN PATENT DOCUMENTS

| | | |
|---|---|---|
| KR | 10-2007-0008668 A | 1/2007 |
| KR | 10-2007-0057783 A | 6/2007 |
| WO | WO 2006/017388 A1 | 2/2006 |

OTHER PUBLICATIONS

Korean Office Action issued on Jul. 22, 2014 in counterpart Korean Application No. 10-2008-0128533. (3 pages in English, 5 Pages in Korean).

*Primary Examiner* — Tammy Lee
(74) *Attorney, Agent, or Firm* — NSIP Law (57) ABSTRACT

An apparatus and method for managing process migration are provided. When a process of a source virtual machine is to be migrated to a target virtual machine based on a process migration request, and the source virtual machine and the target virtual machine are on the same operating system (OS), logical migration is performed by updating information included in a virtual machine information database and a namespace router table.

11 Claims, 8 Drawing Sheets

(56) References Cited

U.S. PATENT DOCUMENTS

| | | | |
|---|---|---|---|
| 2005/0160424 A1 | 7/2005 | Broussard et al. | |
| 2005/0251802 A1 | 11/2005 | Bozek et al. | |
| 2006/0005189 A1 | 1/2006 | Vega et al. | |
| 2006/0085789 A1 | 4/2006 | Laborczfalvi et al. | |
| 2006/0090049 A1* | 4/2006 | Saika | 711/162 |
| 2006/0143350 A1 | 6/2006 | Miloushev et al. | |
| 2006/0156157 A1 | 7/2006 | Ilaselden et al. | |
| 2007/0186212 A1 | 8/2007 | Mazzaferri et al. | |
| 2007/0214505 A1 | 9/2007 | Stavrou et al. | |
| 2007/0244962 A1 | 10/2007 | Laadan et al. | |
| 2008/0086616 A1 | 4/2008 | Asano et al. | |
| 2008/0134199 A1 | 6/2008 | Browning et al. | |
| 2008/0189700 A1 | 8/2008 | Schmidt et al. | |
| 2008/0195760 A1 | 8/2008 | Nudler | |
| 2008/0196043 A1 | 8/2008 | Feinleib | |
| 2008/0201414 A1 | 8/2008 | Amir Husain et al. | |
| 2008/0201455 A1 | 8/2008 | Husain | |
| 2008/0216089 A1 | 9/2008 | Jia et al. | |
| 2008/0235300 A1 | 9/2008 | Nemoto et al. | |
| 2008/0295095 A1 | 11/2008 | Watanabe et al. | |
| 2009/0007106 A1 | 1/2009 | Araujo, Jr. et al. | |
| 2009/0007147 A1 | 1/2009 | Craft et al. | |
| 2009/0063753 A1 | 3/2009 | Dow | |
| 2010/0049917 A1 | 2/2010 | Kono et al. | |
| 2011/0153715 A1 | 6/2011 | Oshins et al. | |

* cited by examiner

VM Information DB

FIG.5

```
<Process #1>
    <Handle #ID> : <Source VM #ID>
    <Handle #ID> : <Source VM #ID>
    <Handle #ID> : <Source VM #ID>
    <Handle #ID> : <Source VM #ID>
<Process #2>
    <Handle #ID> : <Source VM #ID>
    <Handle #ID> : <Source VM #ID>
    <Handle #ID> : <Source VM #ID>
    <Handle #ID> : <Source VM #ID>
```
~330

Namespace Router Table

MANAGING PROCESS MIGRATION FROM SOURCE VIRTUAL MACHINE TO TARGET VIRTUAL MACHINE WHICH ARE ON THE SAME OPERATING SYSTEM

CROSS-REFERENCE TO RELATED APPLICATION

This application is a continuation of U.S. patent application Ser. No. 12/546,961, filed Aug. 25, 2009, which claims the benefit under 35 U.S.C. §119(a) of a Korean Patent Application No. 10-2008-0128533, filed Dec. 17, 2008, the disclosures of which are incorporated herein in their entirety by reference for all purposes.

BACKGROUND

1. Field

The following description relates to virtualization technology, and more particularly, to an apparatus and method for managing process migration.

2. Description of the Related Art Technology for allowing an application program or an operating system (OS) installed in a user's computer to be used in another computer is actively being researched. Examples include process migration technology, packaging technology of a server administrator, OS virtualization technology, and so on.

Unlike system virtualization technology, the OS virtualization technology installs a virtual OS layer between the OS of a computer and a user application program and stores and migrates only the virtual OS layer, the user application program, and data, thereby providing the same computing environment in other computers. Compared with hardware virtualization, such OS virtualization technology supports lightweight migration, and is emerging as technology that can efficiently manage resources of a service provider in an environment, such as utility computing or cloud computing, in which an application is provided to a user as a service.

SUMMARY

According to one general aspect, an apparatus for managing process migration includes a virtual machine information database which includes information of one or more virtual machines executed on one operating system (OS), a namespace router table which includes information about one or more resources accessed by each migrated process according to the migrated processes, and a migration manager which performs logical migration by updating the information included in the virtual machine information database and the namespace router table when a process of a source virtual machine is to be migrated to a target virtual machine on the same OS based on a process migration request.

The virtual machine information database may include namespace information of virtual machines, lists of process identifications (IDs) of processes operating in the virtual machines, and attribute information of the processes corresponding to the process IDs, according to the virtual machines. The attribute information of the processes corresponding to the process IDs may indicate whether the processes are migrated.

When the process performed in the source virtual machine is to be migrated to the target virtual machine on the same OS, the migration manager may remove a process ID of a migrated process from a process ID list of the source virtual machine, add the migrated process ID of the migrated process to a process ID list of the target virtual machine, and change attribute information corresponding to the process ID to indicate that migration is performed in the virtual machine information database.

The information about one or more resources accessed by each migrated process stored in the namespace router table according to the migrated processes may include handle information of the resources and identification (ID) information of a virtual machine before migration.

When a migrated process requests access to the resources accessed before migration, the migration manager may control the process to access the requested resources using a namespace of the virtual machine before migration with reference to a previous virtual machine ID information included in the namespace router table.

According to another general aspect, a method of managing process migration includes receiving a request for process migration from a source virtual machine to a target virtual machine, determining whether the source virtual machine and the target virtual machine are on the same operating system (OS), and when it is determined that the source virtual machine and the target virtual machine are on the same OS, performing process migration by updating a virtual machine information database including information of one or more virtual machines executed on one OS and a namespace router table including information about one or more resources accessed by each migrated process according to the migrated processes.

The virtual machine information database may include namespace information of virtual machines, lists of process identifications (IDs) of processes operating in the virtual machines, and attribute information of the processes corresponding to the process IDs, according to the virtual machines.

The attribute information of the processes corresponding to the process IDs may indicate whether the processes are migrated.

The updating of the virtual machine information database may include removing a process ID of a migrated process from a process ID list of the source virtual machine, adding the process ID of the migrated process to a process ID list of the target virtual machine, and changing attribute information corresponding to the process ID to indicate that migration is performed.

The information about one or more resources accessed by each migrated process stored in the namespace router table according to the migrated processes may include handle information of the resources and identification (ID) information of a virtual machine before migration.

The method may further include, when a migrated process requests access to the resources accessed before migration, controlling the process to access the requested resources using a namespace of the virtual machine before migration with reference to a previous virtual machine ID information included in the namespace router table.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
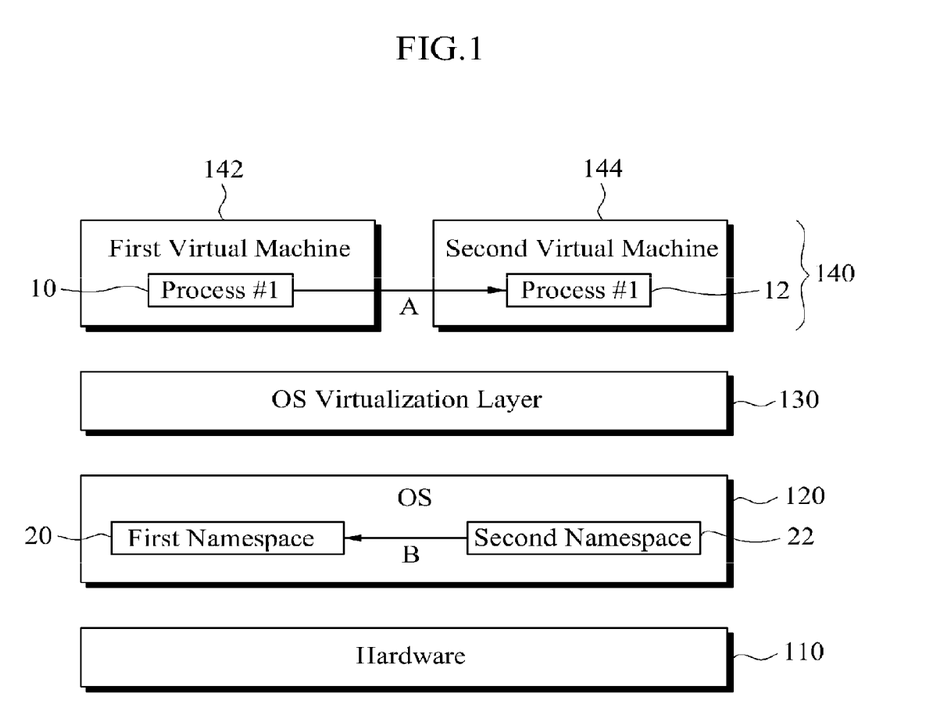
FIG. 1 is a block diagram illustrating an exemplary process migration environment.

FIG. 1 illustrates an exemplary process migration environment. The structure of a system in which process migration can be performed, as shown in FIG. 1 for example, includes a hardware layer 110, an operating system (OS) layer 120, an OS virtualization layer 130, and a user application program layer 140.

When OS virtualization technology is used, it is possible to use the same computing environment as used by a user in another computer by only storing data of the OS virtualization layer 130 and the user application program layer 140 without storing a system OS.

In a computer system, the OS virtualization layer 130 controls applications of the user application program layer 140 to operate as in an environment having many OSs in an environment actually having one OS image. Referring to FIG. 1, for example, a first virtual machine 142 and a second virtual machine 144 operate as on different OSs using namespace virtualization technology. In HG. 1, two virtual machines are illustrated, but the number of virtual machines operating on one OS is not limited thereto.

The application layer 140 accesses system resources using a name and a handle. For example, when the application layer 140 generates or opens, that is, accesses system resources, it obtains a handle from the OS 120 using a name and accesses the system resources using the handle. The namespace virtualization technology renames all system resources, for example, files, registries, kernel objects, and network addresses, thereby allowing each virtual machine to access the system resources. By resource renaming, a first namespace 20 seen by processes of the first virtual machine 142 may be separated from a second namespace 22 seen by processes of the second virtual machine 144.

For example, when the first virtual machine 142 tries to access a file located in /a/b, the OS virtualization layer 130 redirects the access to /a/b to a file located in /vm1/a/b. When the second virtual machine 144 tries to access a file located in /a/b, the OS virtualization layer 130 redirects the access to /a/b to a file located in /vm2/a/b that is different from /vm1/a/b. Here, information such as vm1 and vm2 used for resource renaming is namespace information. This namespace virtualization technology allows virtual machines to perform various operations such as, but not limited to, resource generation, reading, writing, and deletion.

Figure 2:
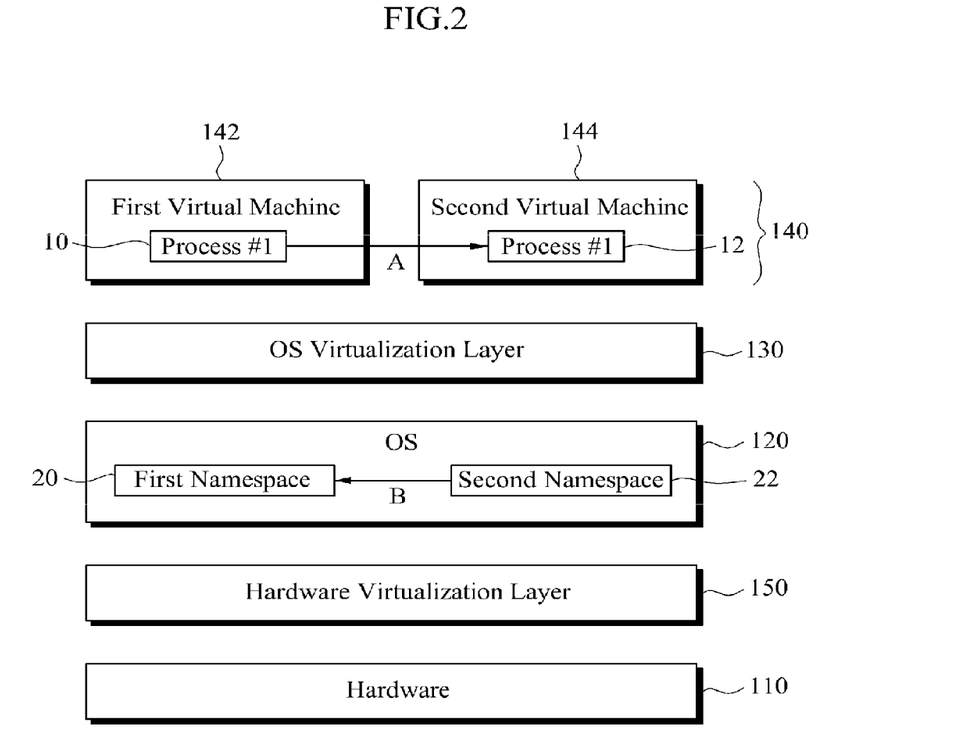
FIG. 2 is a block diagram illustrating another exemplary process migration environment.

FIG. 2 illustrates another exemplary process migration environment.

The structure of a system in which process migration can be performed, as shown in FIG. 2 for example, includes a hardware layer 110, a hardware virtualization layer 150, an OS layer 120, an OS virtualization layer 130, and a user application program layer 140. The hardware virtualization layer 150 is additionally included in the system structure of FIG. 2, and allows the OS layer 120 to use the hardware 110 as a plurality of pieces of hardware. Since the OS virtualization layer 130 is also in the system structure of FIG. 2, virtual machines 142 and 144 may use the namespace virtualization technology in order to access system resources as described with reference to FIG. 1.

When a process 10 is migrated from the first virtual machine 142 to the second virtual machine 144 as indicated by an arrow A in the system environments of FIGS. 1 and 2 (10→12), the migration is performed due to movement to another virtual machine from the viewpoint of the process 10, but a situation before the migration is the same as a situation after the migration from the viewpoint of the OS 120 providing system service to the process 10.

General process migration schemes, such as a checkpoint/restart mechanism, and live migration, are on the assumption that process migration is physical movement like movement of processes on a network or to another storage medium.

For example, the checkpoint/restart mechanism performs process migration as follows. First, a process to be migrated, for example, process #1, is suspended, and a state of process #1 is stored. Process #1 is killed. An executable image and the stored state of process #1 arc moved to another computer through a network or storage device. In the computer to which the executable image and the stored state are moved, a new process is created, a state of the created process is switched to the stored state, and the process is resumed. As a result, migration of process #1 is performed.

Figure 3:
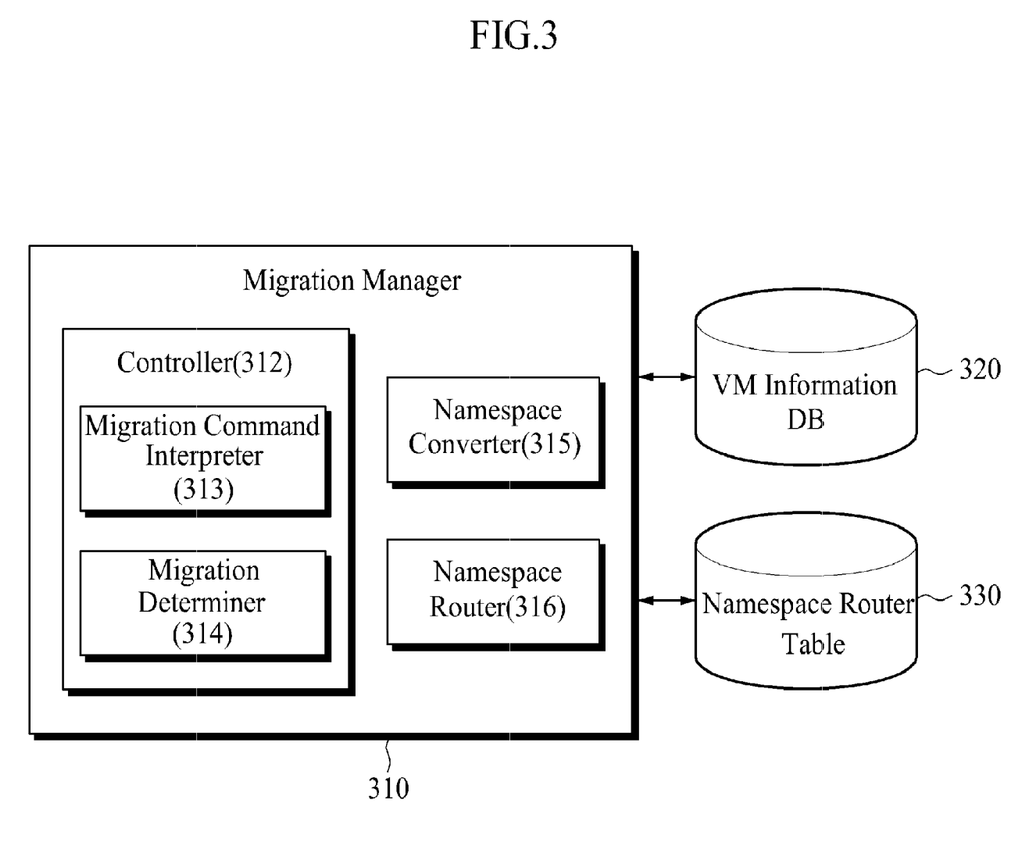
FIG. 3 is a diagram of an exemplary apparatus for managing process migration.

FIG. 3 illustrates an exemplary apparatus for managing process migration. The migration apparatus, according to an exemplary embodiment, includes a migration manager 310, a virtual machine (VM) information database (DB) 320, and a namespace router table 330.

The migration manager 310 manages process migration so as to efficiently perform the migration. For example, the migration manager 310 manages process migration to be performed based on whether a process is moved from one virtual machine to another virtual machine on the same OS.

The VM information DB 320 includes information of one or more virtual machines performed on one OS. The virtual machine information includes namespace information and process information of the virtual machines.

For example, the VM information DB 320 may include namespace information of virtual machines, lists of process identifications (IDs) of processes operating in the virtual machines, and attribute information of the processes corresponding to the process IDs, according to the virtual machines. The attribute information of a process corresponding to a process ID includes information about whether the process is migrated. The process attribute information may be expressed as <Migrated> or <Native>. Here, <Migrated> indicates a migrated process, and <Native> indicates an original process that is not migrated. In addition, according to applications, the virtual machine information may include various information such as an Internet protocol (IP) address, and information about a resource allocation and network access policy.

The namespace router table 330 includes information about one or more resources accessed by each migrated process according to migrated processes. The information about one or more resources may include handle information of the resources, and ID information of a virtual machine, for example, a source virtual machine, to which the corresponding process has belonged before migration. The namespace router table 330 may he updated every time process migration occurs.

As an example, when a process of a source virtual machine should be migrated to a target virtual machine based on a process migration request, the migration manager 310 determines whether the source virtual machine and the target virtual machine are on the same OS. When it is determined that the source virtual machine and the target virtual machine are on the same OS, the migration manager 310 updates information included in the VM information DB 320 and the namespace router table 330, thereby performing logical migration.

Referring to FIG. 3, the migration manager 310 may include a controller 312, a namespace converter 315, and a namespace router 316, and the controller 312 may include a migration command interpreter 313 and a migration determiner 314.

The migration command interpreter 313 receives migration request information from a user's command, for example, and interprets the migration request information. The migration request information may include process ID information about a current process, information about a virtual machine to which a process currently belongs (for example, source virtual machine information), and information about a virtual machine to which migration will be performed (for example, target virtual machine information).

The migration determiner 314 determines whether or not a process to be migrated is moved to another virtual machine on the same OS, and determines a migration method based on the determination. The migration determiner 314 may check whether the virtual machine to which migration will be performed is in the VM information DB 320 and determine whether or not the migration will be performed on the same OS. As mentioned above, the VM information DB 320 stores information about virtual machines on one OS.

When it is determined that the process migration will be performed on the same OS, the migration determiner 314 determines to perform logical migration according to teachings provided herein. On the other hand, when the virtual machine to which migration will he performed is not in the VM information DB 320, the migration determiner 314 performs migration to another OS according to a general process migration scheme.

The namespace converter 315 manages resource access of an application process according to namespace virtualization. For example, when a process requests access to resources, the namespace converter 315 checks a virtual machine to which the process requesting access to resources belongs with reference to the VM information DB 320, and controls the process to access the resources using the namespace information of the checked virtual machine.

When a migrated process accesses resources opened by a virtual machine to which the process has previously belonged, the namespace router 316 performs namespace routing, which allows access to the namespace of the previous virtual machine, with reference to a namespace table without using the namespace of a virtual machine to which the process currently belongs. In FIGS. 1 and 2, an arrow B indicates namespace routing according to an exemplary embodiment.

When a process performed in a source virtual machine is migrated to a target virtual machine on the same OS, the controller 312 removes the process ID of the migrated process from the process ID list of the source virtual machine in the VM information DB 320, adds the process ID of the migrated process to the process ID list of the target virtual machine, and changes attribute information corresponding to the process ID to indicate that migration has been performed. For example, attribute information of a migrated process may be changed from <Native> to <Migrated>.

Information about one or more resources accessed by each migrated process stored in the namespace router table 330 according to the migrated processes includes handle information of the resources and ID information of a virtual machine to which the corresponding process belonged before migration. Also, the information about one or more resources may additionally include ID information of a virtual machine after migration.

When a process is migrated to a target virtual machine, the controller 312 examines a resource access request of the migrated process. When the resource access request of the process is a request to resources accessed before migration, the migration determiner 314 controls the namespace router 316 to refer to the namespace router table 330 and the process to access the resources included in a namespace of a previous virtual machine.

According to an aspect, even if process migration on the same OS is requested, it is performed in consideration of a namespace, which is a logical factor whereby respective virtual machine environments (OS environments) are classified, without using the general checkpoint/restart mechanism. Thus, when process migration on the same OS is requested in a computing environment using OS virtualization, it may be more efficiently performed at reduced cost in consideration of an OS virtualization characteristic.

Figure 4:
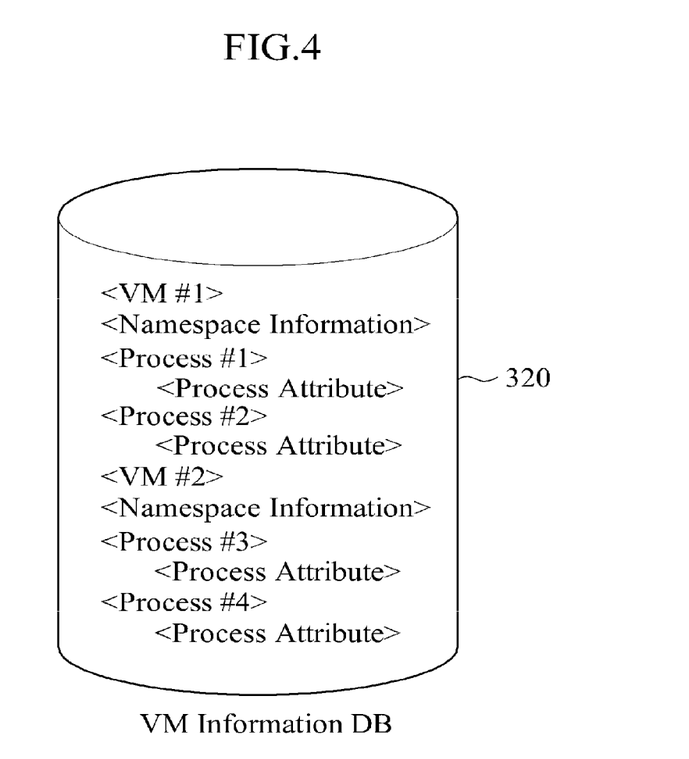
FIG. 4 shows information managed in an exemplary virtual machine information database.

FIG. 4 shows an example of information managed in a VM information DB.

The VM information DB 320 stores information about several virtual machines on the same OS. The virtual machine information may include a process ID list of processes operating in the virtual machines, attributes of the respective processes, and namespace information of the virtual machines. Referring to FIG. 4, process #1 and process #2 belong to virtual machine #1.

Figure 5:
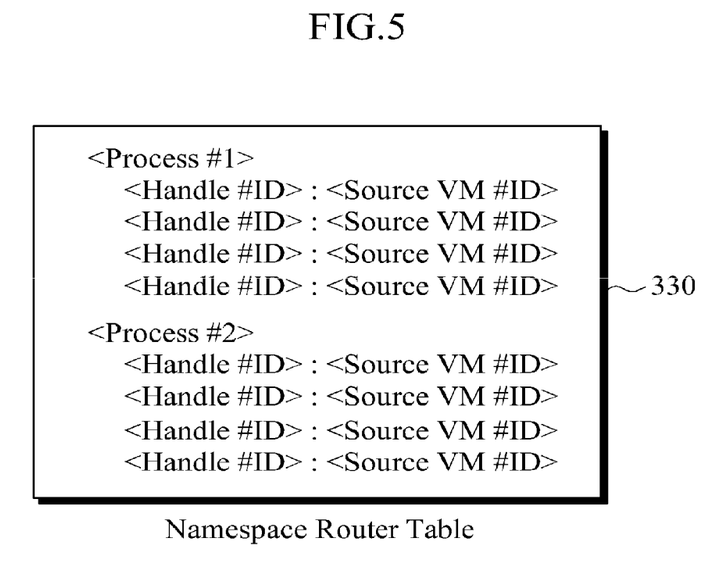
FIG. 5 shows information managed in an exemplary namespace router table.

FIG. 5 shows an example of information managed in a namespace router table.

The namespace router table 330 includes, for example, handles of all resources opened by the corresponding process and the ID of a virtual machine, for example, a source virtual machine, to which the process has belonged before migration.

Figure 6:
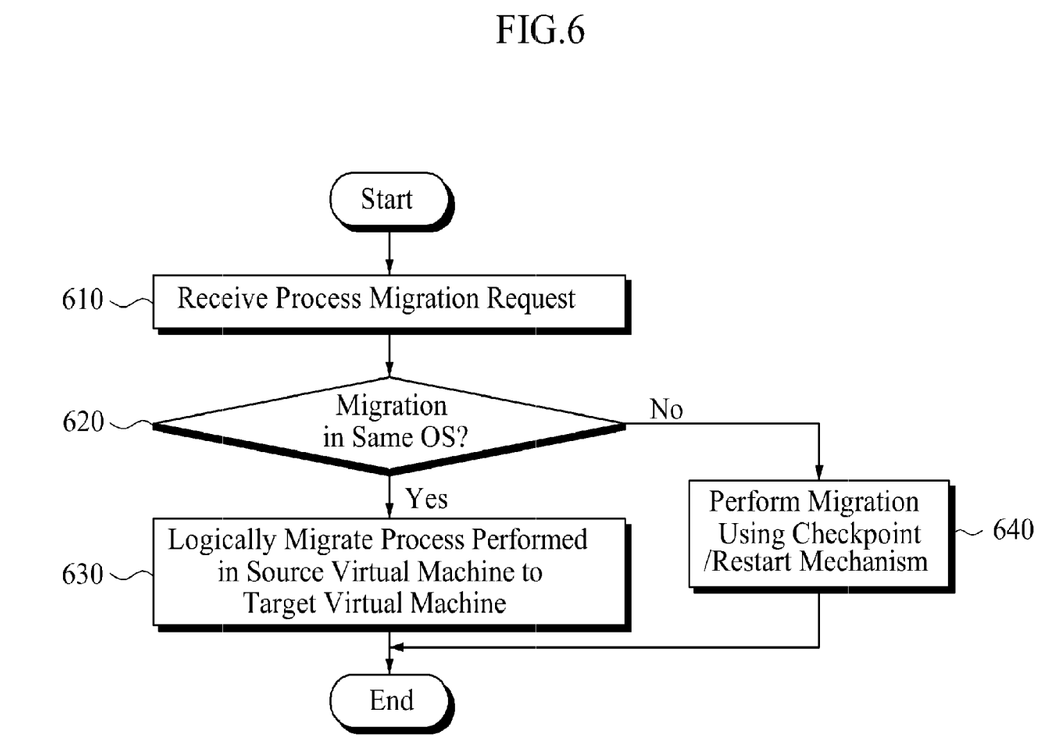
FIG. 6 is a flowchart illustrating an exemplary method of managing process migration.

FIG. 6 is a flowchart illustrating an exemplary method of managing process migration.

In one embodiment, with reference to FIG. 3, a user's migration request is received and analyzed in operation 610. The migration request may include a process ID, a source virtual machine ID, and a target virtual machine ID.

In operation 620, it is determined whether process migration will be performed on the same OS. When the target virtual machine ID is in the VM information DB 320 along with the source virtual machine ID, it may be determined that the process migration will be performed on the same OS.

When it is determined in operation 620 that the corresponding target virtual machine is on the same OS, a process performed in the source virtual machine is logically migrated to the target virtual machine in operation 630. When it is determined in operation 620 that the target virtual machine is not on the same OS, process migration is performed according to a general process migration scheme, for example, a checkpoint/restart mechanism in operation 640.

Figure 7:
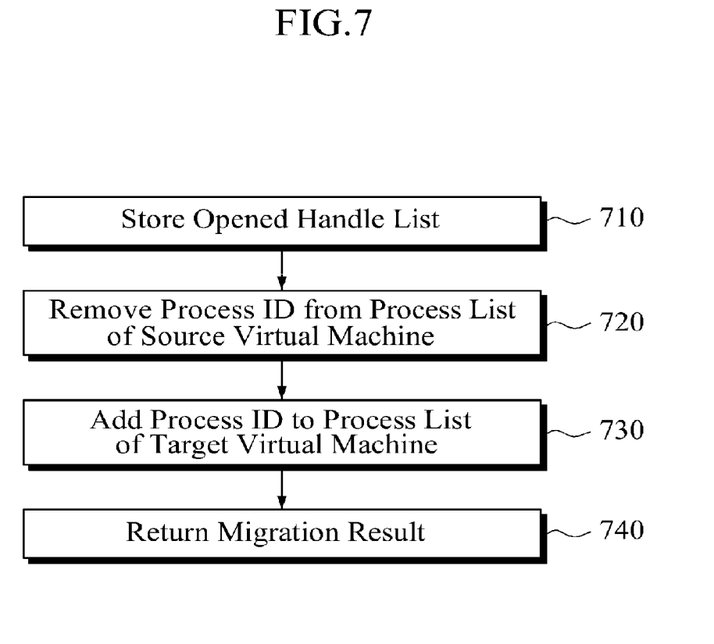
FIG. 7 is a flowchart illustrating an exemplary logical process migration method.

FIG. 7 is a flowchart illustrating an exemplary logical process migration method.

In one embodiment, with reference to FIG. 3, when it is determined that the corresponding target virtual machine is on the same OS, handles of resources opened by a process to be migrated are stored in the namespace router table 330 in operation 710.

The VM information DB 320 removes the process from a process list of a source virtual machine ID in operation 720, and adds the process to a process list of the target virtual machine ID in operation 730. In this case, for example, an attribute of the process is changed to <Migrated>. Operations 710 to 730 of updating the VM information DB 320 and the namespace router table 330 may be performed regardless of sequence. When the migration process is successful, the OS in which the process is moved returns success to the migrated process in operation 740.

Figure 8:
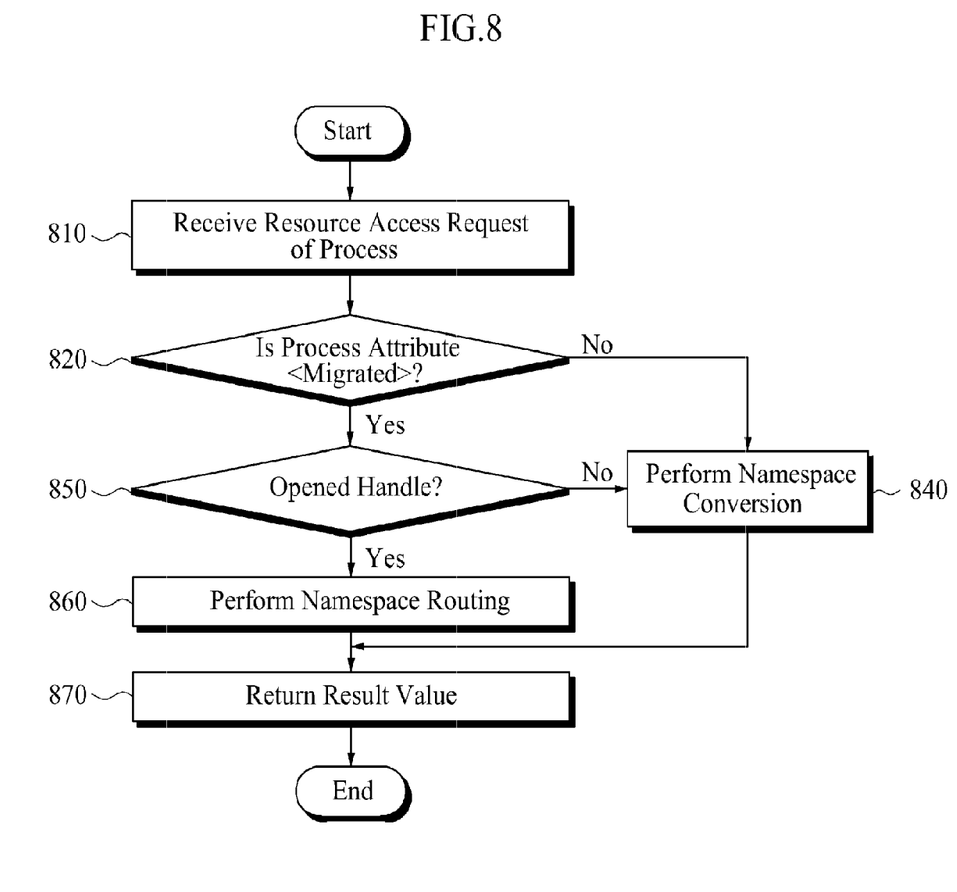
FIG. 8 is a flowchart illustrating an operation after an exemplary process migration.

FIG. 8 is a flowchart illustrating operation after an exemplary process migration.

In one embodiment, with reference to FIG. 3, when a process sends a resource access request to an OS in operation 810, the migration manager 310 intercepts the resource access request and checks an attribute of the process sending the resource access request in operation 820.

When the attribute is <Native>, namespace conversion is performed based on information about a virtual machine to which the process belongs in operation 840.

When the attribute is <Migrated>, it is checked whether a requested resource is in the namespace router table 330, thereby checking whether a handle of the requested resource is opened in operation 850. When the requested resource is not in the namespace router table 330, there is no handle of an opened resource, and thus namespace conversion is performed in operation 840.

When the requested resource is in the namespace router table 330, namespace routing is performed in operation 860. For example, a previous virtual machine is checked with reference to the namespace router table 330 without using the namespace of the corresponding virtual machine, and the namespace of the previous virtual machine is accessed. Thus, when process migration occurs according to an exemplary embodiment and a resource accessed by the previous virtual machine is requested, it is possible to access the resource using the namespace of the previous virtual machine. Even if process migration is performed, a resource accessed in advance can be accessed by the same resource access request so that operation suspended due to the migration can be resumed at reduced cost.

The OS returns a result value of the resource access request sent by the process in operation 870.

According to example(s) described above, process migration may be performed in consideration of an operating system (OS) virtualization characteristic.

According to example(s) described above, unnecessary overhead, for example, killing of a process, storing and loading of a state, and re-creation of a process, may be prevented. The overhead may be generated when process migration occurs on the same OS as described with reference to FIGS. 1 and 2 using a general process migration scheme.

The subject matter disclosed herein, including methods described above, may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims

What is claimed is:

1. An apparatus for managing process migration, comprising:
   a hardware layer; and
   a migration manager configured to perform logical migration by updating information included in a virtual machine information database and information included in a namespace router table when a process of a source virtual machine is to be migrated to a target virtual machine on one operating system (OS) based on a process migration request,
   wherein the information included in the virtual machine information database comprises one or more virtual machines executed on the same OS,
   wherein the virtual machine information database includes attribute information of processes corresponding to process identifications (IDs) indicating whether the processes are migrated and lists of the process IDs of the processes operating in the virtual machines,
   wherein the information included in the namespace router table comprises information about one or more resources accessed by each migrated process according to migrated processes.

2. The apparatus of claim 1, wherein the virtual machine information database further includes namespace information of virtual machines.

3. The apparatus of claim 2, wherein when the process performed in the source virtual machine is to be migrated to the target virtual machine on the same OS, the migration manager removes a process ID of a migrated process from a process ID list of the source virtual machine, adds the migrated process ID of the migrated process to a process ID list of the target virtual machine, and changes attribute information corresponding to the process ID to indicate that migration is performed in the virtual machine information database.

4. The apparatus of claim 1, wherein the migration manager is configured to check whether information of a source virtual machine and information of a target virtual machine, both included in the process migration request, are present in the virtual machine information database, and determine whether or not the migration is to be performed on one OS.

5. The apparatus of claim 1, wherein the migration manager is configured to perform migration using one of general process migration schemes including a checkpoint/restart mechanism and live migration when the process of the source virtual machine is to be migrated to the target virtual machine on a different OS based on the process migration request.

6. A method of managing process migration, the method comprising:
    receiving a request for process migration from a source virtual machine to a target virtual machine;
    determining whether the source virtual machine and the target virtual machine are on the same operating system (OS); and
    when it is determined that the source virtual machine and the target virtual machine are on the same OS, performing process migration by updating a virtual machine information database including information of one or more virtual machines executed on one OS and a namespace router table including information about one or more resources accessed by each migrated process according to migrated processes,
    wherein the virtual machine information database includes attribute information of processes corresponding to process identifications (IDs) indicating whether the processes are migrated, and lists of the process IDs of the processes operating in the virtual machines.

7. The method of claim 6, wherein the virtual machine information database further includes namespace information of virtual machines.

8. The method of claim 6, wherein the updating of the virtual machine information database includes removing a process ID of a migrated process from a process ID list of the source virtual machine, adding the process ID of the migrated process to a process ID list of the target virtual machine, and changing attribute information corresponding to the process ID to indicate that migration is performed.

9. The method of claim 6, wherein the determining of whether the source virtual machine and the target virtual machine are on the same OA includes checking whether information of a source virtual machine and information of a target virtual machine, both included in the request for process migration, are present in the virtual machine information database, and determining whether or not the migration is to be performed on the same OS.

10. The method of claim 6, wherein the performing of the process migration includes performing migration using one of general process migration schemes including a checkpoint/restart mechanism and live migration when it is determined that the process of the source virtual machine is to be migrated to the target virtual machine on a different OS.

11. An apparatus for managing process migration, comprising:
    a hardware layer;
    a virtual machine information database storage device configured to include information of one or more virtual machines executed on one operating system (OS);
    a namespace router table storage device configured to include information about one or more resources accessed by each migrated process according to migrated processes; and
    a migration manager configured to perform logical migration by updating the information included in the virtual machine information database storage device and the namespace router table storage device when a process of a source virtual machine is to be migrated to a target virtual machine on the same OS based on a process migration request,
    wherein the virtual machine information database storage device includes attribute information of processes corresponding to process identifications (IDs) indicating whether the processes are migrated, and lists of the process IDs of the processes operating in the virtual machines.

* * * * *